United States Patent [19]

Inoue et al.

[11] Patent Number: 4,549,947
[45] Date of Patent: Oct. 29, 1985

[54] METHOD AND APPARATUS FOR DEHYDRATION OF WATER-CONTAINING SUBSTANCE BY ELECTRO-OSMOSIS

[75] Inventors: Tadashi Inoue, Fujisawa; Tetsuro Tanaka, Yokohama, both of Japan

[73] Assignee: Asahi Kasei Kogyo Kabushiki Kaisha, Osaka, Japan

[21] Appl. No.: 563,732

[22] Filed: Dec. 21, 1983

[30] Foreign Application Priority Data

Dec. 27, 1982 [JP] Japan .............................. 57-227062
Feb. 8, 1983 [JP] Japan .............................. 58-18126
Feb. 9, 1983 [JP] Japan .............................. 58-18949
Aug. 19, 1983 [JP] Japan .............................. 58-150268

[51] Int. Cl.$^4$ .................................................. B01D 13/02
[52] U.S. Cl. ................................ 204/182.4; 204/301; 204/182.2; 204/182.3
[58] Field of Search ............... 204/180 P, 301, 180 R, 204/151

[56] References Cited

U.S. PATENT DOCUMENTS 3,017,338  1/1962  Butler, Jr. et al. .............. 204/180 P
4,123,342 10/1978  Ahlgren ........................... 204/180 P
4,295,950 10/1981  Cole ................................. 204/180 P Primary Examiner—Andrew H. Metz
Assistant Examiner—B. J. Boggs, Jr.
Attorney, Agent, or Firm—Armstrong, Nikaido, Marmelstein & Kubovcik

[57] ABSTRACT

A method and apparatus is provided for effecting dehydration of a water-containing substance held in a receiving compartment formed in an intervening space between a cathode and an anode by means of the electro-osmotic force of a microporous membrane. The apparatus of this invention has a semipermeable membranes disposed as diaphragms for the receiving compartment and the microporous membrane disposed on the anode side of the diaphragms arranged on the cathode side. It effects the dehydration of the water-containing substance by passing electric current between the two electrodes and discharges the water resulting from the dehydration through a space formed between the microporous membrane and the cathode side diaphragm. By this invention, various water-containing substances such as aqueous solutions, colloids, pastes, dispersions, and gels, which the conventional methods and apparatuses dehydrate with great difficulty, can be dehydrated at high speed with high efficiency.

20 Claims, 6 Drawing Figures

METHOD AND APPARATUS FOR DEHYDRATION OF WATER-CONTAINING SUBSTANCE BY ELECTRO-OSMOSIS

BACKGROUND OF THE INVENTION

1. Field of the Invention:

This invention relates to a method for efficient dehydration of a water-containing substance by electro-osmosis and to an osmotic apparatus for effecting the efficient dehydration. More particularly, this invention relates to novel method and apparatus for efficient dehydration of a water-containing substance by a specific combination of a microporous membrane and a semipermeable membrane.

2. Description of the Prior Art:

Generally, the dehydration of aqueous solution, colloid, paste, dispersion, or gel containing a hydrophilic substance (hereinafter referred to as water-containing substance) has been relatively difficult and has involved an enormous cost. This is paticularly true when the water-containing substance contains a hydrophilic high molecular substance. This is because the water-containing substance often has a high water content due to the peculiar nature of the high molecular substance. Thus, there has been a pressing demand for a method which is capable of efficiently dehydrating such a particularly unmanageable water-containing substance.

For the dehydration of a water-containing substance containing high molecular substances, various methods particularly suited to various properties owned by dissimilar high molecular substances have been proposed or adopted for actual use. For example, the methods of reverse osmosis and ultrafiltration using membranes impermeable to high molecular substances and permeable to water have been proposed for solutions of low viscosity, the methods of reprecipitation such as alcohol precipitation have been proposed for solutions of high viscosity, and the methods of pressing using a gel press and a rubber press have been proposed for hydrous agar, hydrous kappa carragheenin, etc. which gel at normal room temperaure.

Although reverse osmosis and ultrafiltration are efficient methods of dehydration, they are applicable only to those water-containing substances which are solutions of low viscosity and which resist formation of gels and pastes. However, these methods have a disadvantage in that their range of applicability is narrow and that their effective concentration ratio is small. This is because the extent to which the viscosity of the water-containing substances can be lowered by increase of temperature is limited by the durability of the membrane.

The alcohol precipitation method when used for the dehydration of aqueous solutions of high molecular compounds generally necessitates the addition of a large amount of alcohol, when compared to the amount of a high-molecular compound contained in a water-containing substance undergoing treatment. Thus, this method has a disadvantage in that recovery of the spent is a costly procedure.

As methods for the dehydration of highly viscous substances by electro-osmosis, a method for efficient dehydration of gels or pastes has been proposed by Japanese Patent Application Laid-Open Print SHO 54(1979)-76488 and an improved version of this method by Japanese Patent Publication SHO 56(1981)-25167. The method described therein is directed to dehydrating artificially formed gels or pastes by using a cation-exchange membrane of higher electro-osmotic force on the cathode side and an anion-exchange membrane on the anode side, thereby electrically effecting efficient dehydration of a given water-containing substance without requiring mechanical application of pressure. This method also requires installation of at least one water discharge compartment defined on the laterally opposite sides thereof by membranes, which is adapted to protect the water-containing substance undergoing treatment against contamination and to supply required ions to the water-containing substance. This discharge compartment is located in an intermediate portion of the electro-osmosis cell which is not in contact with the two electrodes.

Generally, ion-exchange membranes are made of homogeneous and non-porous materials and exhibit a low electro-osmotic coefficient. In the electro-osmotic dehydration of a water-containing substance, the amount of water permitted to pass through the ion-exchange membranes cannot be overly large, due to the amount of electric power required.

SUMMARY OF THE INVENTION

The inventors conducted an extensive study with a view to widening the variety of water-containing substances for which the method of electro-osmotic dehydration can be effectively applied and to enhancing the efficiency of the dehydration. In the course of this study, they conducted experiments directed developing a membrane having a higher electro-osmotic coefficient than the cation-exchange membrane used as a diaphragm on the cathode side in the aforementioned method. They have, consequently discovered that a microporous membrane has the necessary properties. The inventors have further discovered that construction of a receiving compartment (to which a water-containing substance to be dehydrated is supplied) by specific combination of a microporous membrane with semipermeable membranes provides a far more efficient dehydration of a water-containing substance than could be anticipated from the difference of the electro-osmotic coefficients of the membranes involved. The present invention has been perfected on the basis of this discovery.

To be more specific, this invention primarily provides a method for the dehydration of water-containing substance held inside a receiving compartment formed in a space between a cathode and an anode by means of the electro-osmitic force of a microporous membrane, which comprises using semipermeable membranes as diaphragms of the receiving compartment, arranging the microporous membrane on the anode side of the diaphragm placed on the cathode side, passing electric current between the two electrodes, and withdrawing the water resulting from the dehydration of the water containing substance from a space between the microporous membrane and the aforementioned cathode side diaphragm.

This invention further provides an electro-osmotic apparatus for the dehydration of a water-containing substance by electro-osmosis, comprising a cathode and an anode, a receiving compartment formed in the intervening space between the cathode and the anode, semipermeable membranes disposed or arranged as diaphragms for the receiving compartment formed in the intervening space between the two electrodes, semipermeable membranes disposed and used as diaphragms for the receiving compartment, a microporous membrane arranged on the anode side of the diaphragms positioned on the cathode side, and arranging the microporous membrane and the cathode side semipermeable diaphragm, so that the major parts of the opposed surfaces of the membranes approximate or nearly contact each other, and the remaining minor parts of said opposed surfaces are separated by a distance large enough to form a space for withdrawal of water.

The method and apparatus of this invention are characterized by providing highly efficient electro-osmotic dehydration of not only gels, pastes, and dispersions; but also, aqueous solutions and colloids which the conventional electro-osmotic methods could dehydrate only with difficulty.

The method and apparatus of this invention are also characterized by providing a mechanism wherein the dehydration of a water-containing substance is effectively carried out at any temperature between room temperature and highly elevated temperatures and, therefore, permits the concentrated water-containing substance to be continuously or semicontinuously withdrawn in the form of an aqueous solution or a solid.

This invention is additionally characterized by enabling the dehydration of a water-containing substance in a wide range of viscosities, insofar as the viscosity is such that any economically important component present in the water-containing substance will be prevented from passing through the microporous membrane.

The method and apparatus of this invention are further characterized by enabling the efficient removal of water from a water-containing substance of varying type and withdrawal of the water out of the system, mainly by virtue of the difference in electro-osmotic force between the microporous membrane and the semipermeable membrane used in the electro-osmotic apparatus.

BRIEF DESCRIPTION OF THE DRAWINGS

FIG. 1 represents an apparatus employing one receiving compartment and two buffering compartments, which are interposed between an anode and a cathode. FIG. 2 represents an apparatus employing only one receiving compartment.

FIG. 3 and FIG. 4 each represents an apparatus employing a plurality of receiving compartments and buffering compartments respectively in the space intervening between an anode and a cathode.

DETAILED DESCRIPTION OF THE INVENTION

Figure 1:
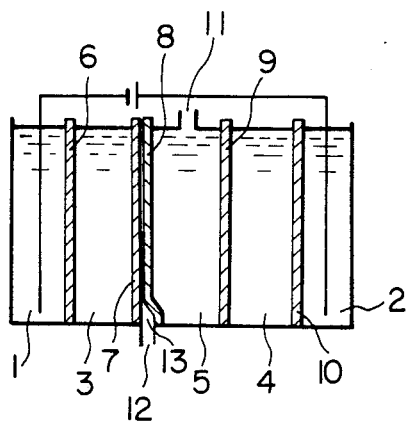
FIG. 1, FIG. 2, FIG. 3, and FIG. 4 are cross sections illustrating typical electro-osmotic apparatuses for achieving the method of this invention for the dehydration or concentration of a water-containing substance.

It is widely known that when a DC electric field is applied to an unglazed pottery plate immersed in a liquid, the liquid passes through the unglazed pottery plate. This phenomenon is called electro-osmosis. In this case, the flow of the electro-osmosis is directed toward the cathode. Thus, it is considered that the liquid is positively charged and the unglazed pottery plate is negatively charged. Generally, in the interface between a solid phase and a liquid phase, polarization occurs on the solid phase side and the liquid phase side. This polarization constitutes the mechanism for the so-called interfacial electric phenomena of which the electro-osmosis is one example. The electric potential originating in this polarization is called the zeta potential. Electro-osmosis is considered to take place because the ion which, on exposure to the zeta potential, responds to the external electric field and moves in company with the viscous flow of water.

It is well known both theoretically and empirically that the magnitude of the electro-osmosis is in direct proportion to the absolute value of the zeta potential and that the direction of the electro-osmotic flow is governed by the sign of the zeta potential.

In electro-osmosis, the viscous flow based on the interaction of molecules of water plays as important a role as the zeta potential. Thus, when ions of dissimilar signs or high molecular matrices are present in the course of the viscous flow, the viscous flow is disturbed and the flux of the electro-osmotic flow is reduced in size. It is, therefore, believed that the amount of water moved by electro-osmosis through a homogeneous membrane or an ion-exchange membrane (generally made of a homogeneous and dense material) cannot readily be increased proportionately with the amount of electric power required for the movement of water, even if the zeta potential of the membrane is large. It is further believed that because the membrane is dense and the high molecular matrices constituting the membrane are always present in the course of the viscous flow, the electro-osmotic flow cannot be readily formed in a large flux.

Concerning the zeta potential of high molecular compounds, numerous researches are now under way on the high molecular compounds used in fibers and films with respect to absorption of moisture, swelling, dyeing, cleaning, and papermaking. During the steps such as elongation and thermal treatment, for example, the high molecular compounds undergo a complicated transformation. The changes in construction and quality of fibers of such high molecular compounds are invariably reflected in the surface conditions thereof. In terms of the condition of electric charge on the surface, these fibers can be divided into anionic fibers and amphoteric fibers. Cellulosic fibers such as cotton and cellulose are partially oxidized by aerial oxidation, so as to acquire carboxyl groups; and polyvinyl alcohol type vinylon acquires carboxyl groups during saponification, for example. Some polyacrylonitrile type fibers are known to acquire strongly acidic sulfonic acid groups resulting from polymeric catalysis. All these fibers exhibit negative electric charge in water because they contain dissociable anionic groups and, therefore, are said to be anionic fibers. It is well known that animal fibers and nylon fibers behave amphoterically, depending on pH because they contain anionic groups and cationic groups.

The surface conditions of these fibers and films directly affect the zeta potential. A hydrophilic homogeneous membrane of neutral cellulose, for example, is negatively charged so that when a DC electric field is applied to the membrane in a liquid, electro-osmosis is generated in the direction of the cathode.

The recent growth of the high molecular compound technology has brought about development of membranes which are made up of high molecular compounds, heretofore used in fibers and films, which are called high molecular microporous membranes. These membranes are finding extensive utility in various applications, such as manufacture of ultrafiltrating membranes and battery diaphragms. They have an advantage in that they possess outstanding features such as exhibiting low electric resistance, permitting production of flexible membranes, enabling free fabrication in varying shapes including films, acquiring pores of a prescribed diameter accurately, permitting incorporation of pores of a small diameter in a high porosity, exhibiting stability to resist chemicals, and warranting ease of handling.

Even though it is made of a neutral high molecular substance, the high molecular microporous membrane acquires high zeta potential as described above through a proper treatment such as elongation, thermal treatment, chemical treatment, or impregnation. Because of this and because it possesses a microporous structure, the inventors inferred that the high molecular microporous membrane could be less liable than the homogeneous membrane to suffer disturbance of the viscous flow due to electro-osmosis. Based on this inference, they experimented on the high molecular microporous membrane with respect to its performance for dehydration of a water-containing substance. They have consequently ascertained that the high molecular microporous membrane exhibits a much higher performance for dehydration of a water-containing substance than any of the membranes adopted by the conventional methods. They have perfected the present invention in the course of further studies motivated by the aforementioned discovery of performance the membrane exhibits for electro-osmosis.

The present invention will be described in further detail below.

Figure 3:
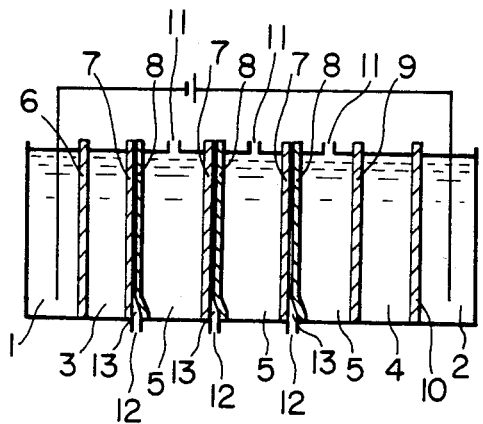

In this invention, a microporous membrane having a high electro-osmotic force is placed on the cathode side of the receiving compartment and a semipermeable diaphragm is placed on the cathode side of the microporous membrane. The microporous membrane and the semipermeable diaphragm are arranged so that they may be substantially in mutual contact with each other or separated by a suitable distance from each other. By the action of an external electric field, the cation passes through the microporous membrane toward the cathode (together with the viscous flow of water) and reaches the intervening space between the microporous membrane and another semipermeable diaphragm having a lower electro-osmotic coefficient. The cation would continue its movement toward the cathode, if the diaphragm was a cation-exchange membrane. Actually, because the diaphragm has a lower electro-osmotic coefficient, the greater part of the water reaching the aforementioned space between the membranes is prevented from passing through this membrane and, therefore, the water is retained in the space. By gravitational attraction or by a very slight external pressure, however, the water retained in the space is readily discharged out of the electro-osmotic cell, thereby providing the dehydration desired at by the present invention. At the same time, the anion present in the water-containing substance is attracted by the force of the electric field toward the cation-exchange membrane on the anode side. The anion remains in the receiving compartment because it passes through the cation-exchange membrane with great difficulty, irrespective of whether the anion is a high molecular compound or an inorganic compound. Thus, the water-containing substance is concentrated. It is believed that a large amount of water removed from the water-containing substance in the present invention based only on the electro-osmotic coefficient of the microporous membrane, because the viscous flow of the anion is very small and the viscous flow of the cation is notably large. If the electro-osmotic cell is of a multi-compartment type as shown in FIG. 3 and the diaphragm is an anion-exchange membrane, neither the cation passing the microporous membrane nor the water is allowed to permeate the diaphragm on the cathode side. Thus, the cation and the water and the inorganic anion, which has been forced by the electric field to pass from the receiving compartment adjoining the cathode side through the anion-exchange membrane, are jointly discharged in the form of water containing an inorganic salt out of the electro-osmotic cell. Separately, the anion in the water-containing substance permeates the anion-exchange membrane on the anode side and is similarly discharged in the form of an inorganic salt. In this manner, hydration and desalination simultaneously proceed. It is readily apparent that a phenomenon intermediate between the two phenomena described above will occur when a neutral membrane is used as the diaphragm. In this case, since the microporous membrane, when suitably selected, prevents the high molecular component from permeating this membrane, it is retained in the receiving compartment irrespective of whether the substance is ionic or not. Thus, the performance of the electro-osmotic cell improves in proportion as the electro-osmotic coefficient of the microporous membrane increases and that of the semipermeable membrane decreases. The method of the present invention provides the dehydration with a notably high efficiency, when compared to the conventional method and, thus, has paved a road to practical utility.

Since this method finds absolutely no use for application of mechanical pressure which is indispensable to electric ultrafiltration, it essentially hinges on the electro-osmotic coefficient of the microporous membrane.

The present invention can employ microporous membranes made of inorganic materials as well as those made of organic materials. As the microporous membrane formed of organic materials usable in the present invention, the synthetic high molecular microporous membranes are particularly suitable to the various objects of this invention, because it exhibits its outstanding practical utility in the following respects:

(1) Because of the flexibility the membrane acquires through proper adjustment of its fabrication, the membrane can be disposed or arranged in a manner so as to be exactly fitted to the shape of the cell.

(2) Because of the high stability and durability inherent therein, the membrane promises a long service life.

(3) Because of the high resistance exhibited by the membrane to acids, alkalis, and other chemicals, the water-containing substance to be dehydrated can be selected from a wide variety.

(4) The membrane readily permits control of its physical properties such as pore diameter, wall thickness, and surface condition.

The synthetic high molecular microporous membrane to be used in the present invention is a membrane obtained by forming numerous open cells in a molded article in the form of film or sheet formed of synthetic high molecular organic compounds.

The synthetic high molecular microporous membrane of this description may be produced by:

(i) A method which comprises the steps of mixing a thermoplastic resin such as polyethylene, polypropylene, polyethylene-type copolymer, polypropylene-type copolymer, polyvinyl chloride, a copolymer thereof, or polyvinylidene fluoride or a resin composition conaining at least one of the aforementioned thermoplastic resins with an inorganic powder having an organic liquid such as dioctyl phthalate adsorbed thereon, melt molding the resultant mixture in the form of film, and then extracting from the film the aforementioned organic liquid alone or in combination with inorganic powder.

(ii) A method which comprises the steps of mixing a thermoplastic resin or thermoplastic resin composition with paraffin and some other extractable substance, melt molding the resultant mixture in the form of film, and subsequently extracting from the film the aforementioned paraffin and the other extractable substance.

(iii) A method which comprises the steps of adding a chemical foaming agent to a thermoplastic resin or thermoplastic resin composition, dissolving the resultant mixture, and extrusion-foam molding the dissolved mixture.

(iv) A method which comprises cold stretching a polyethylene or polypropylene film, thereby forming micropores therein.

(v) A method which comprises irradiating a high molecular film with high-energy rays, thereby forming micropores therein.

These are not the only methods that are available for the preparation of the microporous membrane to be used in this invention. In fact, this microporous membrane may be produced by any of the methods capable of producing the microporous membrane of the aforementioned description. Examples of other methods thus available include the solution casting method which produces a microporous membrane such as an ultrafiltration membrane by dissolving a resin selected from the group consisting of polysulfone, polyacrylonitrile, polyacetyl cellulose, polyamide, and polyimide in conjunction with additives in a solvent and causing the resultant solution to cure, as well as the sintering method.

A typical example of the microporous membrane formed of inorganic materials is a microporous membrane of ceramics. Such a microporous membrane can be obtained, for example, by forming a raw material into a prescribed shape and sintering the formed product.

The microporous membrane of the present invention need not contain any functional group in the micropores or may contain an anionic functional group therein. Examples of the functional group which may be incorporated in the micropores are sulfuonic groups, sulfonate groups, carboxyl groups, carboxylate groups, hydroxyl groups, and phosphoric acid groups. For the purpose of this invention, use of anionic microporous membranes proves to be most desirable.

The microporous membrane, when produced by mixing a thermoplastic resin or thermoplastic resin composition with an extractable substance and subsequently removing the extractable substance from the produced film, will be obtained in a state containing substantially no functional group by effecting the removal of the extractable substance with an organic solvent.

A sulfone group or sulfonic acid group can be added to the thermoplastic resin when the removal of the extractable substance or a chemical treatment of the film is effected with fuming sulfuric acid containing free sulfur trioxide.

Since the membrane has the properties of an electro-osmotic coefficient, a chemical resistance, a thermal resistance, and a wetting property improved consequently; the variety of water-containing substance on which the electro-osmotic dehydration can be effectively carried out is enlarged and dehydration at elevated temperatures is feasible.

When the resin of ethylene-(meth)acrylic acid copolymer, ethylene-(meth)acrylic ester copolymer, or ethylene-vinyl acetate copolymer is used as the thermoplastic resin and fuming sulfuric acid containing free sulfur trioxide is used in effecting the removal of the extractable substance or as the chemical treatment of the produced film, the microporous membrane is obtained in a state incorporating sulfone groups or sulfonic acid groups in a relatively large amount, and which additionally contains carboxyl groups, carboxylate groups, —OH groups, etc. The microporous membrane is by nature advantageously used in a state possessing hydrophilicity. If the microporous membrane happens to lack hydrophilicity, it can be hydrophilized by treatment with an alcohol or surfactant and consequently rendered advantageously usable.

The porosity, average pore diameter, and pore diameter distribution of the microporous membrane may be suitably selected, depending on the type of the water-containing substance to be dehydrated and the properties of the water-containing substance, so as to maximize its electro-osmotic coefficient and, therefore, are not specifically limited. Generally, however, the microporous membrane has a sufficiently low electric resistance, a very high mechanical strength and a high electro-osmotic coefficient, while its porosity is within the range of 20 to 90%, its average pore diameter is within the range of 10 Å to 10$\mu$, and its pore diameter distribution occurs uniformly in a narrow range. The thickness of the microporous membrane is suitably selected in veiw of the type and the properties of the water-containing substance to be dehydrated. Generally, the range of thickness of 10$\mu$ to 20 mm proves desirable from the standpoint of mechanical strength and ease of handling.

The present inventors have determined that when a DC electric field is applied to the microporous membrane immersed in a liquid, only a small amount matrix is present in the path of the viscous flow. The result is that this membrane exhibits a much higher electro-osmosis coefficient than when the electro-osmosis is performed under the same conditions with a cation-exchange membrane which is obtained by sulfonating a copolymer film of vinyl acetate and ethylene and having an exchange capacity of 2.0 meq/g and very high water content of 45%. This latter type of membrane is cited as an example of membrane having a high electro-osmotic coefficient in the aforementioned Japanese Patent Application Laid-Open Print SHO 54(1979)-76488.

The present invention is not limited in that the microporous membrane must have a specific electro-osmotic coefficient. For the membrane to effect more practical dehydration of a gel or paste than any of the membranes used in the conventional method, it is desirable that it has an electro-osmotic coefficient of at least 360 cc/F.

Since the electro-osmotic flow of the anionic microporous membrane is toward the cathode side, it is necessary for efficient dehydration that the membrane should be disposed or located at least on the cathode side in the receiving compartment. It is naturally permissible to enhance the efficiency of dehydration by additionally disposing on the anode side a microporous membrane which has been specially treated so that the surface of the membrane is positively charged. Also, in order to facilitate withdrawal of any gel formed during the dehydration, the microporous membrane can be formed into the shape of a bag, and such a membrane contacted with both the opposed diaphragms set up within the receiving compartment. The position of the microporous membrane is not necessarily limited to the anode side of the cathode side diaphragm in the receiving compartment.

When microporous membranes alone are used as diaphragms in the receiving compartment and no semipermeable membrane is used, effective dehydration of a water-containing substance is obtained only with difficulty, because (1) the substances generated electrochemically within the electrode compartments are liable to contaminate the water-containing substance under treatment and (2) the water liberated in consequence of the dehydration flows back into the electrode compartments. Because of the possibility that nonionic substances of low molecular weights contained in the water resulting from the dehydration will give rise to electrochemical reactions at the electrodes and cause secondary contamination of the water-containing substance under treatment, it is essential that a membrane such as a neutral membrane or an ion-exchange membrane, which has a dense texture and low electric resistance and which permits only nominal permeation of water due to electro-osmosis or diffusion, should be used as a diaphragm besides the microporous membrane in the receiving compartment.

In this invention, as is evident from FIG. 3, the diaphragm 9 which partitions the buffering compartment 4 on the anode side and the receiving compartment 5 is called an anode side diaphragm, and the other diaphragms 7 disposed inside the receiving compartment 5 are called cathode side diaphragms. In the apparatus of a multi-compartment type construction as illustrated in FIG. 3, the diaphragm partitioning the cathode compartment 1 or the buffering compartment 3 on the anode side and the receiving compartment 5, as well as the diaphragm partitioning one receiving compartment 5 and another receiving compartment 5, are called a cathode side diaphragm, insofar as the diaphragm is positioned on the cathode side of the aformentioned anode side diaphragm 9. In FIGS. 1-6, 1 denotes a cathode compartment, 2 an anode compartment, 6 a diaphragm for a cathode compartment, 8 a microporous membrane, 10 an anode side diaphragm, 11 an inlet for water-containing substance, 12 a water outlet, 13 a space for discharge of water, 14 a buffering compartment, 15 a porous plastic plate, 16 a supporting frame for supporting a semipermeable membrane and microporous membrane and having a water outlet for discharging the separated water out of the cell, and 17 a spacer disposed on the water outlet for dynamically supporting the diaphragm 7 while passing the water therethrough.

This invention finds no use for the electro-osmotic ability of an ion-exchange membrane as used in the aforementioned Japanese Patent Publication SHO 56(1981)-25167. On the contrary in the present invention, the cathode side diaphragms and the anode side diaphragm are desired to possess a low electro-osmotic coefficient, because they are required to be permeable only to ions and impermeable to the water which passes through the microporous membrane and to the water which is held in the anode compartment.

The diaphragm which fulfils these requirements is not always an ion-exchange membrane. It may be a hydrophilic semipermeable dense membrane which has a smaller electro-osmotic coefficient than the microporous membrane. Typical hydrophilic neutral membranes are membranes of cellophane, polyvinyl alcohol, and cellulose acetate. In particular an ion-exchange membrane is highly desirable, because it provides a membrane generally made of homogeneous and dense material and only permits nominal permeation of water due to electro-osmosis.

Concrete examples of such desirable ion-exchange membrane are cation-exchange membranes having a sulfone group, carboxyl group, phosphoric acid group, phosphorous acid group, phenolic hydroxyl group, sulfonic acid amide group, or perfluoro-tertiary alcohol as the ion-exchange group; and anion-exchange membranes having a quaternary ammonium salt group, primary, secondary, or tertiary amine, tertiary sulfonium salt group, or quaternary phosphonium salt group as the ion-exchange group.

Further, the present invention can also use cation-exchange membranes and anion-exchange membranes having such cation-exchange groups and anion-exchange groups ununiformly distributed in the membrane walls, amphoteric ion-exchange membranes having such cation-exchange groups and anion-exchange groups uniformly distributed in the membrane walls, composite ion-exchange membranes having cation-exchange groups and anion-exchange groups deposited in superposed layers, and mosaic ion-exchange membranes having zones respectively of cation-exchange groups and anion-exchange groups parallelly arranged in the direction of membrane thickness.

Still further, ion-exchange membranes containing other functional groups such as, for example, ester group, amide group, halogen group, nitrile group, acyl group, phosphoric ester group, and hydroxyl group are similarly usable in the present invention.

Any one of these membranes may be used singly or two or more of these membranes may be used in a combined form, as the diaphragm of the present invention.

Figure 2:
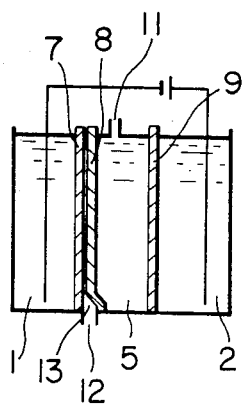

In the case of an apparatus which is not provided with a buffering compartment as illustrated in FIG. 2, a cation-exchange membrane which is stable in alkalis is more desirably used as the cathode side diaphragm than an anion-exchange membrane which is liable to lose stability in alkalis, because the electrolytes are alkalinized as a result of electrolysis. When cation-exchange membranes are exclusively used as the diaphragms, the water-containing substance is only dehydrated and retains its composition intact. Even when the water-containing substance to be dehydrated is an aqueous solution of an inorganic salt, efficient dehydration and concentration of the aqueous solution is attained by using a cation-exchange membrane having a desirable transference number.

In reducing this invention to practice, it is desirable for the electro-osmotic cell of this invention to be a multi-compartment type construction, as illustrated in FIG. 3, which increases the apparatus's capacity for treatment. Even with this construction, efficient dehydration is not obtained when the water which has permeated the microporous membrane flows into the receiving compartment adjoining the cathode side. The electro-osmotic cell of this construction, however, is able to provide efficient dehydration when diaphragms having a smaller electro-osmotic coefficient than the microporous membrane are used, so as to ensure obstruction of the movement of water and to permit the water to be withdrawn out of the cell.

In the apparatus of FIG. 3, the cathode side diaphragm in one receiving compartment constitutes, itself, the anode side diaphragm in another receiving compartment which adjoins the cathode side. When an anion-exchange membrane is used as this diaphragm, therefore, dehydration and desalination proceed simultaneously, when the water-containing substance under treatment contains an inorganic salt. When a cation-exchange membrane used as the diaphragm, the water-containing substance is only dehydrated and it retains its composition intact.

This method provides highly efficient dehydration of a water-containing substance for which any of the ordinary methods of filtration dehydrate only with difficulty. It also permits a size reduction in the apparatus.

Examples of the cation-exchange membrane which is advantageously used in this invention include exchange membranes of fluorocarbon polymers containing a sulfone group, exchange membranes of styrene-divinylbenzene resins containing a sulfone group, cation-exchange membranes produced from a vinyl chloride type resin or a resin composition containing a vinyl chloride resin and possessed of sulfone group content of at least 0.1 meq/g. These membranes have been proposed in Japanese Patent Application Laid-Open Print SHO 58(1983)-17122, SHO 58(1983)-117225, etc., as membranes suffering from nominal permeation of water due to electro-osmosis, exhibiting lower electric resistance, and permitting stable handling in the atmosphere. Also, usable are cation-exchange membranes obtained by incorporating a sulfone group in a film of ethylene type copolymer and composite ion-exchange membranes reinforced with a microporous membrane as proposed in Japanese Patent Publication SHO 52(1977)-29988 and Japanese Patent Application Laid-Open Print SHO 57(1982)-212232, etc.

The semipermeable membrane which constitutes a diaphragm in this invention is not specifically limited insofar as the electro-osmotic coefficient of the selected membrane is smaller than that of the microporous membrane. It is nevertheless desirable that its electro-osmotic coefficient be as small as possible within the range in which passage of water into the neighboring compartment and entry of water into the receiving compartment are precluded. The membrane is particularly advantageously when the electro-osmotic coefficient does not exceed 900 cc/F. It is more advantageous when it does not exceed 360 cc/F.

The paste which is advantageously dehydrated by the present invention is a paste of an inorganic substance or an organic substance whose viscosity falls in the range in which any of the conventional methods of filtration provide desired filtration with difficulty. The aqueous solution which is advantageously dehydrated by this invention is in a state having a given substance dissolved in water. In particular, the aqueous solution of a high molecular compound to which this invention provides efficient dehydration is an aqueous solution of a high molecular compound, whose viscosity falls in the range in which any of the conventional method of filtration provides the desired dehydration with difficulty. The colloid to which this invention provides efficient dehydration is a substance having very fine particles (generally measuring about $10^{-5}$ to $10^{-7}$ cm in diameter) stably dispersed in water.

In this case, the actual phenomena which ensue from the electro-osmosis are dissimilar when the water-containing substance under treatment is electrically charged and when it is not electrically charged, although the principle of the dehydration remains the same. To be specific, when the water-containing substance is electrically charged, it is drawn toward the electrode of opposite charge, because of the phoresis caused by the external electric field. In this case, when the water-containing substance is an anionic natural or semi-synthetic high molecular electrolyte and the viscosity of the substance at a concentration of 2% by weight exceeds 10 cps at 25° C., the high molecular substance tends to be gelled on the anode side diaphragm. Thus, removal of this gel accomplishes the desired dehydration and concentration of the water-containing substance. When the anionic high molecular electrolyte is placed in the receiving compartment of the apparatus of the aforementioned construction, the high molecular substance is carried by its own electric charge in the direction away from the microporous membrane, leaving behind a water layer having low electroconductivity and low viscosity. The microporous membrane expels this water phase out of the receiving compartment by virtue of electro-osmosis and diffusion. Thus, the flow of electric current through the system can be continued without interrupting the electrophoresis of the substance.

When the water-containing substance to be dehydrated is devoid of an electrical charge or is an anionic water-containing substance other than those mentioned above, the gelation by the concentration polarization due to the electric field gradient is difficult to achieve. By suitably selecting the diameter of micropores formed in the microporous membrane, therefore, selective separation of water is effected without causing the flow of the water-containing substance to be impaired by the electro-osmotic flow.

When the water-containing substance to be dehydrated possesses a postitive electric charge, the water-containing substance tends to be accumulated on the microporous membrane and the efficiency of dehydration is degraded. The dehydrating capacity of the microporous membrane nevertheless can be utilized to advantage by suitably selecting the diameter of micropores formed in the membrane and further causing proper turbulence in the flow. If the diameter is too large, there is a possibility that the water-containing substance to be dehydrated will flow out. Thus, the diameter of the micropores must be selected to suit the particular water-containing substance to be dehydrated.

Concrete examples of the water-containing substance to be dehydrated by the method and apparatus of this invention are aqueous solutions, colloids, pastes, dispersions, and gels of high molecular compounds containing organic substances used as a stabilizer or viscosity-bodying agent. Examples of such organic substances are seaweed extracts such as kappa, lambda, and iota type carragheenins, furcellaran, alginates, and agar; vegetable proteins such as soybean protein and wheat protein; vegetable polysaccharides such as starch; vegetable fats such as soybean lecithin; viscous seed extracts such as locust bean gum, guar gum, tamarind gum, and queen seed; resinous viscous substances such as arabic gum, tragacanth gum, and karaya gum; viscous vegetable substances such as pectin and arabinogalactan; microorganically produced viscous substances such as xanthan gum, pullulan, dextran, and curdlan; animal proteins such as gelatin, casein, and albumin; animal fats such as egg-yellow lecithin; starch derivatives such as starch phosphate and carboxymethyl starch; cellulose derivatives such as hydroxyethyl cellulose, carboxymethyl cellulose, methyl cellulose, and ethyl cellulose; microcrystalline cellulose; alginic acid derivatives such as alginic acid propylene glycol ester; and various synthetic high molecular compounds such as polyvinyl alcohol, polyvinyl pyrrolidone, and polyacrylic acid.

This invention permits separation of aqueous solutions containing tissues of organic bodies and low molecular organic compounds. Such tissues of organic bodies are sliced, crushed, or ground and introduced in the form of slurry, colloid, paste, or gel into the receiving compartment and subjected to electro-osmotic dehydration.

The tissues of organic bodies contemplated by this invention include muscular tissues, nerve tissues, and connective tissues, and particularly meats and internal organs of fish and shellfish, beasts and birds in the case of animals. They are skin tissues and pulpy tissues and particularly roots, stalks, branches, flowers, leaves, fruits, seeds, buds, rinds, and barks in the case of plants. In a special case, fungal tissues are also included.

In the case of plants, the present invention is effective in extraction of juice from roots, stalks, branches, flowers, leaves, fruits, seeds, buds, rinds, and tree barks, removal of non-starchy components not needed, and collection of enzymes, vitamins, hormones, and aromatic components. In the case of animals, it is effective in collection of extracts, hormones, enzymes, and vitamins from meats, internal organs, and brains of fish and shellfish, beasts, and birds, removal of sources of offensive odor, and removal of nonproteinaceous components not needed. It is also effective in collection of useful components from fungal tissues.

Examples of the inorganic substances are metal oxides and metal hydroxides such as silicic acid, silicates, aluminum hydroxide, cement, and clay which possess numerous —OH groups on the surface and form hydrated gels or pastes when added to water. Particularly in a process for the manufacture of a metal oxide or composite metal oxide to be used as a catalyst on a chemical reaction, the metal oxide or composite metal oxide is obtained by dissolving such a water-soluble salt as carbonate, nitrate, sulfate, or organic acid salt of a metal in water, neutralizing the resultant solution with an alkali thereby causing precipitation or coprecipitation, dehydrating, and firing the precipitate or coprecipitate. The method of the present invention can be advantageously utilized during the step of dehydration.

Such an inorganic substance is dehydrated from the state of paste or colloid.

Needless to mention, the method of this invention can be effectively applied to an aqueous solution of a substance whose molecular weight is so large that its passage may be amply stopped by the microporous membrane. When a substance dissolved in water has such a small molecular weight that its passage cannot be stopped by the microporous membrane, it is necessary that the substance should be contained in an ionized state in the water.

When this invention is utilized for the dehydration of a water-containing substance containing an organic substance, the practice of divesting the water-containing substance of extraneous salts; by, for example, washing with water, diffusion, dialysis, or superfiltration; before the water-containing substance is subjected to the dehydration is highly advantageous for the purpose of increasing the dehydration speed and enhancing the economy of electric power consumption. When the water-containing substance in the form of an aqueous solution, dispersion, or gel contains a low molecular electrolyte, namely an inorganic salt such as sodium chloride or potassium chloride, as an extraneous matter (an aqueous solution of a natural high molecular compound extracted from seaweed aptly answers this description); this invention provides highly efficient dehydration after the water-containing substance has been previously divested of the inorganic salt.

Considering various forms of desalination by the present invention, the desalination by diffusion dialysis effects the removal of an inorganic salt from a water-containing substance in the form of aqueous solution or dispersion (hereinafter referred to as "aqueous solution") by placing the water-containing substance on one side of a diaphragm (a semipermeable membrane impermeable to high molecular substances and permeable to low molecular organic salts and/or inorganic salts) and water on the other side of the diaphragm thereby allowing the low molecular organic salts and/or inorganic salts to pass through the diaphragm in the direction from the water-containing substance of the form of aqueous solution to the water. In this case, when the aqueous solution and the water are both in a freely flowing state, there is derived an advantage that the concentration gradient of the salt across the diaphragm is increased and the efficiency of desalination is proportionately heightened. Maintenance of the two solutions in the freely flowing state can be advantageously obtained by keeping them mechanically stirred with stirring blades or circulated with a pump.

Ultrafiltration is an operation for simultaneously effecting dehydration and desalination of a given water-containing substance in the form of aqueous solution. This achieved with the present invention by placing this water-containing substance on one side of an ultrafiltration membrane and establishing pressure difference between the side of the membrane retaining the water-containing substance and the remaining side of the membrane.

An intermediate method between the ultrafiltration and the diffusion dialysis effects desalination of a water-containing substance in the form of aqueous solution by keeping the water-containing substance under pressure on one side of an ultrafiltration membrane and holding water on the other side (discharge side) of the membrane. When the aqueous solution side and the water side are both in a freely flowing state, the concentration gradient of the salt across the ultrafiltration membrane is increased and the degree of desalination is proportionately heightened. Maintenance of these two solutions in a freely flowing state may be accomplished by a method which comprises fluidifying the aqueous solution under pressure within a diaphragm molded in a hollow shape and contacting the periphery of the hollow diaphragm with running water. Similarly, to the aforementioned ultrafiltration, this method forces both water and the salt out of the diaphragm by application of pressure and is desirable in that both desalination and dehydration proceed simultaneously.

Desalination of a water-containing substance in the form of gel by washing with water may be accomplished most simply by the method which comprises throughly contacting the gel with water in motion. Although this method may be advantageously applied to a gel which is not readily dissolved with water, it cannot be effectively applied to the gel which is readily dissolved in water. When the gel is washed with water and, at the same time, exposed to ultrasonic waves, the salts in the gel are released from the confinement therein to the extent of accelerating the speed of diffusion of such salts to the surface of the gel and enhancing the speed of desalination.

When the desalination of the water-containing substance is effected by diffusion dialysis or washing with water, the water content of the water-containing substance inevitably increases, apparently contrary to the dehydration and concentration aimed at by the present invention. Even if the water content of the water-containing substance is increased somewhat before application of the potential difference, the method of desalination which by nature brings about a slight increase in the water content of the water-containing substance under treatment proves sufficiently advantageous, because the desalination serves the purpose of notably heightening the speed and efficiency of dehydration by electro-osmosis. Thus, the diffusion dialysis and washing with water of the gel are embraced among the embodiments of this invention for desalination of the water-containing substance.

As a measure for the desalination of the water-containing substance by ultrafiltration according to this invention, the method described below is particularly advantageous because of its high productivity.

In detail, the method, which is particularly advantageous for desalination of an aqueous solution of anionic high molecular polysaccharide as one form of water-containing substance contemplated by this invention, comprises the desalination by circulating the aqueous solution via an internal pressure type conduit to a filtration module incorporating a hollow-yarn or thin-channel type ultrafiltration membrane and, during this desalination, ensures highly efficient passage of water through the ultrafiltration membrane by keeping the shear rate of the aqueous solution at the outlet of the hollow yarns or thin channels of the membrane at a high level; for example, about 1000 $sec^{-1}$; thereby lowering the apparent viscosity of the aqueous solution.

This method enjoys an advantage that even a highly viscous aqueous solution of an anionic natural high molecular polysaccharide of low concentration can be desalinated at high productivity and; at the same time, dehydrated and concentrated and divestment of low molecular impurities, as well with virtually no loss of the natural high molecular polysaccharide can be achieved.

Now, this invention will be described specifically with respect to the dehydration of a water-containing substance containing carragheenin, for example. Carragheenin is produced by boiling seaweed (Gigartina mammillosa) in hot water or an aqueous alkali solution and extracting a useful component at a solid concentration of 1 to 1.5% by weight. The extracted-useful component contains about 10% by weight, based on the solids, of impurities such as coloring components and low molecular substances and some tens of % by weight of other inorganic salts. This extract has a yellowish brown to blackish brown color.

To free this extract from seaweed residues and very fine solid particles suspended therein, the extract is mixed with diatomaceous earth as filter aid and filtered through a filter pressure or centrifugal separator. This operation is not necessarily efficient even when the concentration of the useful component in the extract is on the order of 1% by weight, because the extract is a highly viscous liquid.

The filtrate resulting from the foregoing treatment is then passed through a layer packed with activated carbon for adsorptive removal of coloring components and very fine particles of impurities. This treatment removes substantially no part of the inorganic salts and does not proceed smoothly, because of the high viscosity of the filtrate. In particular, when the layer is formed of granular-activated carbon capable of regeneration and reuse, this treatment is not considered efficient, because the filtrate fails to permeate into the interiors of the micropores in the activated-carbon particles.

When the pressure applied for facilitating ultrafiltration is fixed, the ratio of passage of water through the ultrafiltration membrane is reversely proportional virtually linearly to the viscosity of the aqueous solution under treatment. An advantageous procedure can be carried out without any appreciable addition in cost. This procedure comprises preparatorily diluting the extracted aqueous solution of carragheenin to a low concentration, then subjecting the diluted aqueous solution more easily to a primary filtration with a filter press using diatomaceous earth as filter aid, and subjecting the resultant filtrate to a secondary filtration with an ultrafiltration membrane for removal of a large volume of water. By this procedure, the purity of the product increases in proportion as the ratio of dilution is increased because the amounts of inorganic salts and impurities entrained by the filtrate are proportionately increased.

In the case of an aqueous solution of carragheenin extracted at a concentration of 1% by weight, for example, substantial removal of the inorganic salts and impurities contained in the aqueous solution is attained by preparatorily diluting the aqueous solution with hot water to a solids content of 0.5% by weight, subjecting the diluted aqueous solution to a primary filtration with a filter press, and thereafter subjecting the resultant filtrate to ultrafiltration.

Another method for effecting ultrafiltration advantageously on the water-containing substance, which is susceptible of sharp increase of viscosity, is a procedure which comprises constantly keeping fresh water supplied via a bypass to the ultrafiltration device, so as to make up for the water being removed out of the system during the process of ultrafiltration. This enables the desired desalination to be achieved without appreciably changing the concentration of the high molecular substance. In this method, when the ultrafiltration of the water-containing substance is effected by circulating the solution through the system, this circulation can be continuously carried out by introducing the diluting water through the bypass without requiring an extra dilution tank. The continuous circulation has an advantage in that the content of inorganic salts can be steadily lowered with high efficiency.

When the device for ultrafiltration used for the desalination of water-containing substance is provided in a multi-stage construction, it enjoys an advantage that possible increases of viscosity of the filtrate at the outlet side can be efficiently curbed by continuously introducing the diluting water via the bypass incorporated at a proper point in the entire length of the device.

The thoroughness with which the water-containing substance is to be desalinated for the sake of this invention is variable with the kind of the water-containing substance under treatment, the type of the pretreatment involved and so on. When the water-containing substance is in the form of aqueous solution or dispersion, the desalination is desirably carried out until the concentration of inorganic salts in the solution or dispersion falls below 1% by weight, more desirably below 0.5% by weight, and preferably below 0.2% by weight. When the water-containing substance is in the form of water-containing gel of a high molecular substance, the desalination is desired to be carried out until the concentration of coexisting inorganic salts based on the high molecular substance falls below 50% by weight, more desirably below 25% by weight, and preferably below 10% by weight.

Once the water-containing substance has undergone the aforementioned treatment of desalination, the dehydration by electro-osmosis according to the present invention can be advantageously carried out at an extremely high speed with high efficiency.

For some uncertain reason, the electro-osmotic coefficient of the high molecular microporous membrane is heavily affected by the inorganic salts coexisting in the water-containing substance; namely the efficiency of dehydration is lowered and the speed of dehydration concentration is decreased in portion as the content of inorganic salts is increased. Practically for the sake of the electro-osmotic dehydration of a water-containing substance, it is very important to desalinate the aqueous solution, paste, colloid, dispersion, or gel and to prevent inorganic salts from leaking, excessively, into the water-containing substance held inside the receiving compartment while the electro-osmotic dehydration and concentration is in process.

The leakage of inorganic salts during the electro-osmotic dehydration of the water-containing substance means a phenomenon in which the electrolytes present in the anode compartment and the cathode compartment during the dehydration and concentration, or the acid and alkali generated in the anode compartment and the cathode compartment, flow into the water-containing substance. This leakage is most effectively prevented by contacting the water-containing substance and the electrolyte through the medium of a semipermeable diaphragm, namely, by interposing the semipermeable membrane therebetween. This method properly curbs the passage of inorganic salts and other extraneous substances into the water-containing substance and, therefore, serves to prevent the efficiency of dehydration from decreasing. This method has an advantage in that ionic high molecular compounds are prevented from undesirable modification, because any direct contact between the water-containing substance and the electrodes is precluded. It is important to note that during the electro-osmotic dehydration and concentration of a water-containing substance containing a high molecuar substance, the leakage into the water-containing substance of the acid and alkali generated within the electrode compartments brings about the following adverse effects, in addition to the aforementioned decrease of the efficiency of dehydration: (1) The leakage of an acid, for example, causes ion exchange on the counter ion of the ionic high molecular substance in the water-containing substance. (2) In the course of dehydration, drying, and/or dissolution in hot water (for regelation), the leakage has an adverse effect of decomposing the water-containing substance, with the result that the product is discolored and imparied in terms of viscosity and gelating property and, consequently, thereby possibly prohibited from acquiring good quality.

Therefore, for successful electro-osmotic dehydration and concentration of the water-containing substance containing an ionic high molecular substance, it is imperative that the leakage of acid and alkali, particularly acid, into the water-containing substance under treatment should be avoided by all means. Prevention of the leakage of the acid may be accomplished by (a) using electrolytes in large amounts, thereby lowering any possible change of pH value during the passage of electric current, or (b) gradually mixing the electrolyte in the anode compartment with that in the cathode compartment. In particular, the following methods are advantageous:

(1) Using a buffer as the electrolyte in the anode compartment.

(2) Providing cation-exchange resin, in the electrolyte in the anode thereby neutralizing the acid generated in the anode compartment.

(3) Providing a cation-exchange resin bed containing the electrolyte or a buffering compartment between the anode and the cathode, thereby neutralizing the acid and/or preventing the acid from leaking into the water-containing substance.

(4) Providing a cation-exchange membrane alongside the semipermeable diaphragm, thereby neutralizing the acid and/or preventing the acid from leaking into the water-containing substance.

By properly combining the aforementioned methods, possible contact of the acid with the water-containing substance can be avoided to the utmost extent, so as to ensure efficient dehydration of the water-containing substance.

In the case of a water-containing substance containing carragheenin, for example, carragheenin can be prevented from undergoing a chemical change by keeping the pH value of the electrolyte above a weak acid. From the standpoint of the prevention of the chemical change, the pH value is preferably maintained in the neighborhood of 7.

Where an alkaline pH value is detrimental, it suffices to neutralize the alkali generated in the cathode compartment or prevent the alkali from leaking into the water-containing substance. On the same principle mentioned above, it is desirable to minimize the possible contact of the alkali with the water-containing substance by using a buffer of $pH \leq 7$, an anion-exchange resin, or an anion-exchange membrane.

In any of the various methods enumerated above, the desire to have the counter ion of the ion-exchange group in the water-containing substance retained in or exchanged for some particular ion species is fulfilled by equalizing the ion species or counter ion species of the electrolytic buffer, ion-exchange resin, or ion-exchange membrane to be used with the aforementioned particular ion species. Then, the purpose of either retaining or exchanging the counter ion species is accomplished, while the dehydration is continued without any interruption.

Now, the prevention of the leakage will be described with reference to the water-containing substance containing carragheenin. By equalizing the cation of the electrolyte and the counter ion of the cation-exchange resin or cation-exchange membrane with the desired counter ion of the carragheenin, the desired retention or exchange of the counter ion of the carragheenin can be carried out advantageously without interrupting the dehydration.

By using $K^+$ as the counter ion of the carragheenin, there can be obtained a gel of high water content or a gel of high strength. To produce carragheenin having high water content and high gel strength, therefore, it is desirable for the aforementioned electrolyte, buffer, cation-exchange resin, or cation-exchange membrane to contain $K^+$. The pH value of the gel is desired to fall in the neighborhood of 7.

Figure 4:
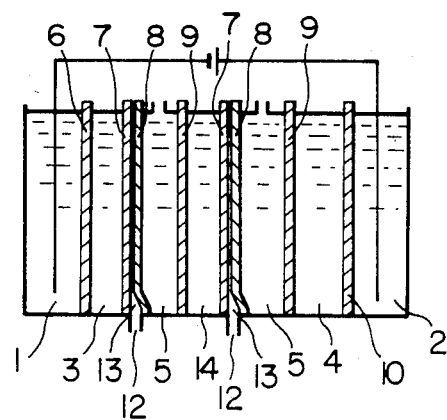
Figure 5:
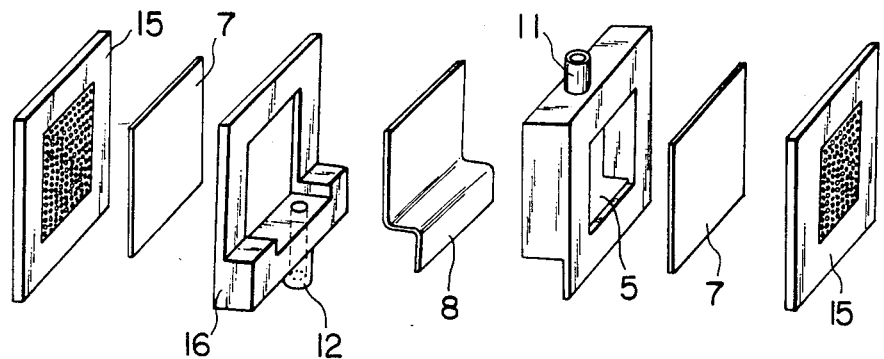
FIG. 5 and FIG. 6 are perspective views illustrating principal components of the electro-osmotic apparatus of the present invention.
Figure 6:
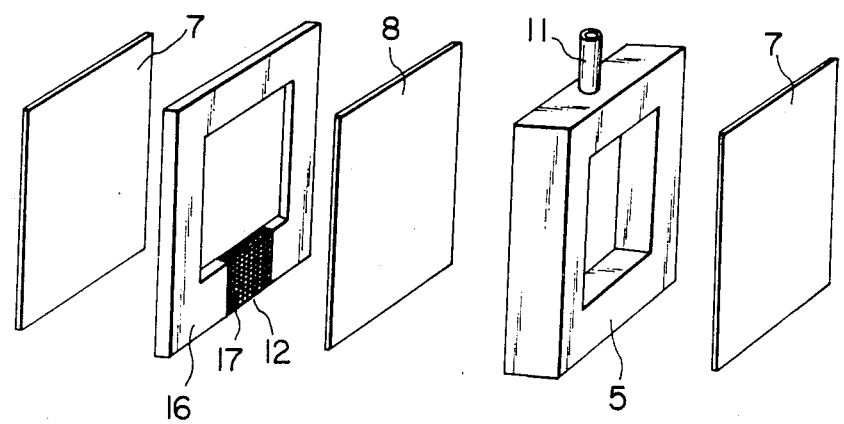

When the apparatus of the present invention is designed in a construction containing a plurality of receiving compartments as illustrated in FIG. 3 or FIG. 4, the water separated from the water-containing substance can be withdrawn from each of the receiving compartments. Consequently, the number of electrode compartments can be minimized and the water-containing substance in a large amount can be dehydrated with small amount of electric power consumption.

When a water-containing substance which has had its extraneous salt content previously extremely decreased so that the efficiency of the dehydration is enhanced, is to be dehydrated in the multicompartment type apparatus of FIG. 3, a phenomenon similar to the phenomenon of hydrolysis involved in the process of electrodialysis may occur. Consequently, the pH value of the separated water tends to shift toward the alkali side and the pH value of the gel or paste in part or most in the receiving compartment tends to shift toward the acid side.

For prevention of the aforementioned shifting of the pH value of the gel or paste toward the acid side, the provision of the buffering compartment 14 containing the electrolyte therein between each receiving compartment as illustrated in FIG. 4 is a desirable measure. Functions of the aforementioned buffering compartment 14 are that (1) it functions to prevent occurrence of the phenomenon of hydrolysis or to reduce the degree of the phenomenon of hydrolysis, by the addition of salts or ions into the receiving compartments or between the semipermeable membrane and the microporous membrane; and (2) it functions to prevent diffusion of acids which generates in the phenomenon of the hydrolysis into the neighbouring receiving compartment.

Consequently, it is preferable to suitably select the electrolyte and the semipermeable membrane consisting the buffering compartment depending upon the purpose intended. For example, a cation-exchange membrane having a cation transference number of not more than 0.95 is particularly advantageously as the cathode side diaphragm, so as to largely reduce occurrence of the hydrolysis while retaining a high efficiency of the dehydration. In the apparatus as illustrated in FIG. 4, the phenomenon of the hydrolysis may also take place, but the pH of the gel or paste tends to shift toward the alkali side. This phenomenon is prevented by adding to the functions of the buffering compartment 14, a fuction of removing or neutralizing the alkaline substance contained in the gel or paste.

In the present invention, the occurrence of the phenomenon of hydrolysis and its harmful effects on the gel or paste can be prevented by suitably selecting the type of apparatus, the kind of membrane (depending on magnitude of the cation transference number), the kind and concentration of the electrolyte contained in the buffering compartment and also by suitably selecting the current density. In the apparatus of FIG. 4, it is needless to say that the counter ion of the gel or paste can be suitably varied by properly selecting the kind of the electrolyte contained in the buffering compartment.

In the apparatus of the present invention for electro-osmotic dehydration of a water-containing substance, the microporous membrane and the semipermeable membrane are partially separated to provide a space 13 to be used for the withdrawal of the water removed from the water-containing substance. The space 13 is formed in the lower portions respectively of the microporous membrane 8 and the cathode side diaphragm 7 in the apparatus illustrated in FIGS. 1-6. Optionally, it may be formed in the upper or middle portions of these membranes. Except for the portions forming the space 13 used for the withdrawal of the removed water, the portions of the microporous membrane and the semipermeable membrane (the greater parts of the opposed surfaces of the membranes) are desired to be held in intimate contact with each other or opposed to each other across a thin sheet of liquid (water or aqueous solution). When the space 13 for the withdrawal of water is formed in the lower portions of the two membranes and if the opposed surfaces of the membranes are separated by a distance so large that the liquid can no longer be retained by surface tension between the opposed surfaces, then the liquid intervening between the semipermeable membrane and the microporous membrane completely flows down the space. Consequently, the path of the electric current is interrupted and the dehydration can no longer be continued. When the space 13 for the withdrawal of water is formed in the lower portions of the two membranes, therefore, the distance separating the opposed surfaces of the two membranes should be kept within the range in which the liquid can be retained so that it is held between the opposed surfaces by surface tension. This restriction is not so severe when the space is formed in the upper portions of the two membranes, as when it is formed in the lower portions. In the light of the spirit of this invention which resides in drawing water from the water-containing substance by utilizing the electro-osmotic force of the microporous membrane and then effecting withdrawal of the water intercepted by the semipermeable membrane, the distance between the microporous membrane and the semipermeable membrane is desired to be as small as permissible.

Now, the present invention will be described more speciffically below with reference to tests, working examples, and comparative experiments, none of which are limiting of the present invention.

The viscosity, electro-osmotic coefficient, electric resistance, porosity of microporous membrane, average pore diameter and cation transference number to be referred to hereinafter were determined by the methods described respectively below.

Viscosity (centipoise)

This property was determined by a viscosimeter, type B, under the temperature condition of 25° C.

Electro-osmotic coefficient (cc/F)

This property was determined with a device of popular adoption, using an aqueous 0.05N sodium chloride solution (25° C.) as a test liquid and passing a DC electric current under the condition of constant current density 55 milliamperes/cm². It was reported in terms of the volume (cc) of the test liquid transferred per farad of electricity passed.

The expression used in this invention that the semipermeable membrane has a smaller electro-osmotic coefficient than the microporous membrane means that this coefficient measured by the method described above is smaller or the transfer of water occurs in the direction of the anode side.

Electric resistance ($\Omega$-cm$^2$)

This property was determined in an aqueous 0.05N sodium chloride solution at 25° C., in accordance with a method usually followed in the determination of electric resistance of membrane.

Porosity of microporous membrane (%)

The magnitude was calculated in accordance with the formula shown below.

$$\text{Porosity (\%)} = \frac{\text{Total volume of pores}}{\text{Volume of microporous membrane}} \times 100$$

Average pore diameter of microporous membrane ($\mu$m)

This magnitude was determined by taking measurement of major and minor diameters each of a total of 200 pores on the surface of a given microporous membrane observed in a photograph taken through a scanning electron microscope and finding the arithmetic mean of such diameters.

Average particle diameter of cellulose

This magnitude was determined by the use of a centrifugal sedimentation type particle diameter distribution tester, marketed under trademark designation of CP-50, made by Shimazu Seisakusho.

Cation transference number

This magnitude was determined by taking measurement of the electric potential of membrane in accordance with conventional procedure under the conditions that both sides of the sample membrane had the concentration of 0.2M/0.1M and the liquid temperature was kept at 25° C. using potassium chloride as an electrolyte.

Test 1

In a kneader, 100 parts by weight of vinyl chloride type resin (produced by Chisso Corporation and marketed under trademark designation of Nipolit MH), 43 parts by weight of dioctyl phthalate, and 5 parts by weight of an organic tin malate type stabilizer (produced by Nitto Kasei Co., Ltd. and marketed under trademark designation of TVS N2000E4) were melted and kneaded at 160° C. for 30 minutes. The resultant composition was melted and extrusion molded with an extruder to produce a film 50$\mu$ in thickness.

This film was sulfonated with fuming sulfuric acid containing 10% by weight of free sulfur trioxide (42° C.), then washed by an ordinary (conventional) method, and treated to have the sulfonic acid group thereof converted into a sodium salt group to produce a cation-exchange membrane having electric resistance of 6.2 $\Omega$-cm$^2$. This cation-exchange membrane was found to have an extremely small electro-osmotic coefficient of 55 cc/F.

Test 2

A sheet of woven fabric of polyproplene (50-denier filaments) irradiated with electron beams under an atmosphere of nitrogen gas was impregnated with a liquid monomer mixture consisting of 20 parts by weight of divinylbenzene (purity 55%), 80 parts by weight of styrene, 40 parts by weight of dibutyl phthalate, and 0.5 part by weight of benzoly peroxide and then heated to effect polymerization of the monomer mixture and produce a film. Subsequently, the film was sulfonated in dichloroethane saturated with sulfuric anhydride-dioxane adduct (5° C.), washed by an ordinary method, and treated to convert the sulfonic acid group thereof into a sodium salt group, so as to produce a cation-exchange membrane of 130$\mu$ in thickness. It was found to have an electric resistance of 7.2 $\Omega$-cm$^2$ and an electro-osmotic coefficient of 100 cc/F.

Test 3

At room temperature, 81 parts by weight of a vinyl chloride type resin (produced by Chisso Corporation, and marketed under trademark designation of Nipolit MH), 9 parts by weight of chlorinated polyethylene (produced by Showa Denko K.K. and marketed under trademark designation of Elaslan 303B), and 10 parts by weight of a copolymer of 92.3 mol% of ethylene and 7.7 mol% of ethyl acrylate (MI=2) were dry blended.

Subsequently, 31 parts by weight of dioctyl phthalate and 5.5 parts by weight of an organic tin malate type stabilizer (produced by Nitto Kasei Co., Ltd. and marketed under trademark designation of TVS N2000E4), both based on the amount of the aforementioned vinyl chloride type resin, were added to the resin mixture produced as described above. The resultant mixture was melted and kneaded in a kneader at 160° C. for 30 minutes to produce a resin composition.

The resin composition was extrusion molded through an extruder at 190° C. to form a film of 80$\mu$ in thickness. The film was sulfonated with fuming sulfuric acid containing 10% by weight of free sulfur trioxide (42° C.) and then washed and neutralized by an ordinary method to produce a cation-exchange membrane having a sodium sulfonate group. This membrane was found to have an electric resistance of 2.4 $\Omega$-cm$^2$ and an electro-osmotic coefficient of 130 cc/F.

Test 4

A polyethylene type microporous membrane (having a thickness of 200$\mu$, an average pore diameter of 0.02$\mu$, and a porosity of 55%) containing 50% by weight of finely divided particles of silica was sulfonated with fuming sulfuric acid containing 10% by weight of free sulfur trioxide (30° C.), washed by an ordinary method, then immersed in an aqueous solution of 30% by weight of sodium hydroxide (60° C.) to effect extraction of finely divided silica and neutralization of the sulfonic acid group. Consequently, there was obtained a hydrophilic microporous membrane having exchange capacity 0.08 meq/g, an electric resistance of 13.0 $\Omega$-cm$^2$, and an electro-osmotic coefficient of 6500 cc/F.

Test 5

In a kneader, 80 parts by weight of an ethylen type copolymer (M.I.=1) having —COOCH$_3$, —COOH, and —COONa groups and obtained by saponifying (to a saponification degree of 60 mol%) and neutralizing (to a neutralization degree of 30 mol%), a copolymer consisting of 94.2 mol% of ethylene and 5.8 mol% of methyl methacrylate, and 20 parts by weight of high-density polyethylene (density 0.955 g/cm$^3$, M.I.=7) were kneaded at 190° C. for 30 minutes. Then, 100 parts by weight of the resultant resin mixture and 43 parts by weight of liquid paraffin (made by Kokusan Chemical Co., Ltd.) were kneaded at 190° C. for 30 minutes. The resultant resin composition was extrusion molded through an extruder at 180° C. to produce a film of 40$\mu$ in thickness. This film was immersed in 1,1,1-trichloroethane to remove the liquid paraffin therefrom, caused to react with fuming sulfuric acid containing 10% by weight of free sulfur trioxide, washed with concentrated sulfuric acid, diluted sulfuric acid, and water in the order mentioned, subsequently hydrolyzed and neutralized simultaneously with an aqueous solution of 31% by weight of potassium hydroxide at 60° C., washed with water, and dried to produce a cation-exchange membrane having a cation transference number of 0.90. This membrane was found to have an electric resistance of 1.0 $\Omega$-cm$^2$, and an electro-osmotic coefficient of 290 cc/F.

Test 6

A microporous membrane (a thickness of 200$\mu$, an average pore diameter of 0.02$\mu$, and a porosity of 55%) formed by a known method from a resin composition which had been produced from dioctyl phthalate, finely divided silicic anhydride, and powdered high-density polyethylene (density of 0.950 g/cm$^3$ and M.I.=1) was used as a substrate. A dispersion prepared by mixing 95 parts by weight of latex (solids content 40% by weight) containing an ethylene type copolymer resulting from partial neutralization (degree of neutralization 30%) of a copolymer of 95 mol% of ethylene and 5 mol% of methacrylic acid with 5 parts by weight of isopropyl alcohol was spread on the membrane substrate with a coating rod in a resin thickness of 2$\mu$ to form a coating on the membrane. The coated microporous membrane was aged at 90° C. for one hour to produce a film.

Then, two sheets of the film were superposed, with their respective coated surfaces opposed to each other, and laminated with a hot press to produce a composite film. Thereafter, by following the procedure of Test 1, the composite film was sulfonated, washed, and immersed in an aqueous solution of 31% by weight of sodium hydroxide at 60° C. for simultaneous neutralization and extraction of silica from the membrane to produce a cation-exchange membrane having a cation transference number of 0.90. This membrane was found to have an electric resistance of 23 $\Omega$-cm$^2$, an exchange capacity of 3.2 meq/g for sulfone group in the sulfonated ethylene type copolymer membrane, and an electro-osmotic coefficient of 490 cc/F.

Test 7

By following the procedure of Test 1, except that the thickness of a film was changed to 40$\mu$, there was obtained a cation-exchange membrane having an electro-osmotic coefficient similar to that of the cation-exchange membrane obtained in Test 1.

EXAMPLES 1–4

In an apparatus set up as illustrated in FIG. 1, cation-exchange membranes (having available membrane area 25 cm$^2$) obtained in Test 1 were used as diaphragm 6 in the cathode compartment 1, a diaphragm 10 in the anode compartment 2, a cathode side diaphragm 7 in the receiving compartment, and an anode side diaphragm 9 in the receiving compartment 5. A polyethylene type microporous membrane containing 50% by weight of finely divided silica (having a thickness of 200$\mu$, an average pore diameter of 0.02$\mu$, a porosity of 55%, an electric resistance of 15.4 $\Omega$-cm$^2$, and an electro-osmotic coefficient of 1570 cc/F), a microporous membrane of polypropylene [a membrane having a thickness of 25$\mu$, a maximum pore diameter of 0.4×0.04$\mu$, a porosity of 45%, an electric resistance of 3.0 $\Omega$-cm$^2$, and an electro-osmotic coefficient of 1210 cc/F, obtained by immersing a polypropylene sheet (produced by Celanese Plastics Co. and marketed under trademark designation of Celgard 3501) in isopropanol and subsequently substituted with water], a microporous polysulfone membrane (having a thickness of 80$\mu$, an average pore diameter of 0.002$\mu$, a porosity of 75%, an electric resistance of 7.1 $\Omega$-cm$^2$, and an electro-osmotic coefficient of 1620 cc/F), and a hydrophilic microporous membrane of Test 4 were used in different runs as a microporous membrane 8. The cathode compartment 1, the anode compartment 2, and the buffering compartments 3, 4 were filled with an aqueous solution of 1% by weight of potassium sulfate and the receiving compartment 5 having a space 1 cm in thickness was continuously fed through the inlet 11 with an aqueous solution of 0.93% by weight of xanthan gum (produced by Rhône Poulenc Japan and marketed under trademark designation of Rhodigel 23) (viscosity about 2000 cps) (with the supply in the receiving compartment 5 continually replenished by addition of fresh supply of the aqueous xanthan gum solution). Electric current was passed the apparatus under the condition of a constant current of 0.1 A to effect dehydration of the aqueous xanthan gum solution by electro-osmosis for half an hour. Then, the aqueous solution held in the receiving compartment 5 was withdrawn and the apparatus was disassembled for inspection of the interior. Consequently, a large volume of dehydrated and concentrated xanthan gum paste was found adhering to the anode side diaphragm.

From the results shown in Table 1, it is noted that, during the flow of electric current through the apparatus, water containing no xanthan gum was discharged through the outlet 12 in an amount far greater than could be expected from the measured magnitude of the electro-osmotic coefficient of the membrane and that, consequently, the aqueous solution of xanthan gum was highly concentrated and converted into paste. During the flow of electric current, the average voltage applied to the receiving compartment 5 was very low and the efficiency of dehydration and concentration was notably high.

During the flow of electric current, the electrolytes in the cathode compartment 1 and the anode compartment 2 were continuously circulated and neutralized, and the aqueous solution in the buffering compartments 3, 4 was continually replaced with a fresh supply of the aqueous solution of 1% by weight of potassium sulfate, so as to effect continuous dehydration by electro-osmosis. The value of solids concentration was determined by drying a given sample under hot draft at 40° C. for not less than 12 hours.

TABLE 1

| Example No. | Kind of microporous membrane | Liquid withdrawn through outlet | | Produced paste | | Average voltage applied to receiving compartment*(V) |
|---|---|---|---|---|---|---|
| | | Amount (cc) | Solids content (Wt %) | Amount (cc) | Solids content (Wt %) | |
| 1 | Polyethylene type microporous membrane | 55 | ~0 | 11.5 | 5.1 | 11 |
| 2 | Microporous membrane of polypropylene | 56 | ~0 | 11.0 | 5.2 | 10.5 |
| 3 | Polysulfone microporous membrane | 55 | ~0 | 10.9 | 4.9 | 13.5 |
| 4 | Microporous membrane of Test 4 | 59 | ~0 | 11.0 | 5.5 | 9.5 |

*Average voltage applied between the cathode side surface of the cathode side diaphragm 7 and the anode side surface of the anode side diaphragm 9.

EXAMPLE 5

The aqueous solution of xanthan gum was dehydrated and concentrated by following the procedure of Example 1, except that the cation-exchange membranes used as the cathode side diaphragm 7 in the receiving compartment 5 and the anode side diaphragm 9 of the receiving compartment 5 were substituted with cellophane type semipermeable membranes for use in smoke-casing (having a thickness of 120μ, an electric resistance of 18.7 Ω-cm$^2$, and an electro-osmotic coefficient of 150 cc/F; produced to Toho Cellophane Co., Ltd. and marketed under trademark designation of TOHO CASING EP #135). Through the outlet 12, 28 cc of water containing no xanthan gum was withdrawn. On the anode side diaphragm 9, 8.6 g of xanthan gum paste having a solids content of 4.6% by weight was deposited. From these results, it is noted that this operation effected dehydration and concentration to a fairly large extent despite the fact that the cathode side diaphragms 7 and the anode side diaphragm 9 were both semipermeable membranes incapable of ion exchange. The average voltage applied to the receiving compartment 5 was only 4 V, indicating that the electric power consumption in this operation was very small.

EXAMPLE 6

An aqueous solution of 0.8% by weight of xanthan gum obtained by fermenting sucrose by a known method, diluting the resultant fermented product to three times the original volume with water, and separating the spent microorganic cells from the diluted broth (by centrifugation) was dehydrated by electro-osmosis for 60 minutes under the condition of constant current 0.2 A in the same apparatus as used in Example 1; except that the cation-exchange membranes used as the cathode side diaphragm 7 in the receiving compartment 5 and the anode side diaphragm 9 in the receiving compartment 5 were substituted with cation-exchange membranes of Test 2, and the aqueous solution of 1% by weight of potassium sulfate used as the electrolytes in the electrode compartments and in the buffering compartment was substituted with an aqueous solution of 5% by weight of potassium sulfate.

The liquid (67 cc) withdrawn through the outlet 12 was found to contain no xanthan gum. The amount 15.6 g of xanthan gum paste deposited on the anode side diaphragm 9 had a solids content of 5.0% by weight, indicating that the aqueous solution had been sufficiently dehydrated and concentrated.

The average voltage applied between the receiving compartments during the flow of electric current through the apparatus was 6 V. The results show that the fermentation broth could be efficiently dehydrated and concentrated with small electric power consumption.

EXAMPLE 7

An aqueous solution of xanthan gum was dehydrated by electro-osmosis by following the procedure of Example 5 in the apparatus of Example 6; except that the cation-exchange membranes of Test 2 used as the cathode side diaphragm 7 in the receiving compartment 5 and the anode side diaphragm 9 in the receiving compartment 5 were substituted with water-insoluble polyvinyl alcohol films (having a thickness of 120μ, a electric resistance of 106 Ω-cm$^2$, and an electro-osmotic coefficient of 90 cc/F) obtained by saponifying polyvinyl acetate films with subsequently thermal treatment, and the magnitude of electric current was changed to 0.5 A. The liquid (85 cc) withdrawn through the outlet 12 was found to contain no xanthan gum and the amount 11.0 g of xanthan gum paste deposited on the anode side diaphragm 9 had a solids content of 8.2% by weight, indicating that the aqueous solution had been sufficiently dehydrated and concentrated.

The average voltage applied between the receiving compartments during the dehydration was 12 V, indicating that even in the system using neutral semipermeable membranes, the dehydration was effected with high efficiency and small electric power consumption.

EXAMPLE 8

An aqueous solution of γ-globulin (having a solids content of 8.9% by weight and an electric conductivity of 1.7 mS), obtained by defibrinating the plasma from swine blood and desalinating and concentrating the defibrinated plasma through ultrafiltration, was dehydrated for 120 minutes under the condition of constant current 0.125 A in the apparatus of Example 5, except that the electrolytes and the buffer solution were substituted by an aqueous solution of 5% by weight of sodium sulfate. The liquid (40 cc) withdrawn via the outlet 12 was found to contain substantially no organic substance. The amount 2.3 g of gel deposited on the anode side diaphragm had a solids content of 37.8% by weight, indicating that the aqueous solution had been concentrated to a very high extent. The average voltage applied between the receiving compartments during the dehydration was 8 V, indicating that the dehydration was carried out with high efficiency and small electric power consumption.

EXAMPLE 9

An aqueous solution of 2.18% by weight of sodium alginate was dehydrated and concentrated by following the procedure of Example 1, except that the cation-exchange membranes used as the cathode side diaphragm 7 in the receiving compartment 5 and the anode side diaphragm 9 in the receiving compartment 5 were substituted by cation-exchange membranes of Test 3.

The liquid (12 cc) withdrawn through the outlet 12 was found to contain no sodium alginate and the amount 6.4 g of sodium alginate paste deposited on the anode side diaphragm 9 had a solids content of 5.9% by weight. The average voltage applied between the receiving compartments during the dehydration was 4 V. From these results, it is noted that the aqueous sodium alginate solution could be dehydrated and concentrated very efficiently.

EXAMPLE 10

In an apparatus set up as illustrated in FIG. 2, cation-exchange membranes of Test 3 were used as the cathode side diaphragm 7 and the anode side diaphragm 9, and a polyethylene type microporous membrane used in Example 1 was adopted as the microporous membrane 8. The cathode compartment 1 and the anode compartment 2 were filled with an aqueous solution of 5% by weight of sodium sulfate and the receiving compartment 5 having a space of 1.1 cm in thickness was continuously fed with an aqueous solution of pectin, to effect dehydration under constant voltage. The results were as shown in Table 2. It is noted from this table that the aqueous solution could be efficiently dehydrated even under the condition of constant voltage.

dilution effected alternately on the solution being circulated in the device.

The solution was cooled to room temperature, fed continuously into the receiving compartment of an apparatus similar to the apparatus of FIG. 3, and subjected to continuous dehydration under the conditions indicated in Table 4.

The results as illustrated in Table 5 show that dehydration speed and dehydration efficiency were excellent.

TABLE 3

| | |
|---|---|
| Ultrafiltration module | Hollow fibers of polysulfone |
| Material of membrane | resin |
| Hollow fiber size (outside diameter/inside diameter) | 1.4 mm/0.8 mm |
| Number of hollow fibers | 2,400 |
| Module diameter × length | 114 mm × 1126 mm |
| Available membrane area | 5.7 m$^2$ |
| Split molecular weight | 6000 |
| Operating pressure | |
| Inflow pressure | 1.75~2.15 kg/cm$^2$ |
| Outflow pressure | 0.2~0 kg/cm$^2$ |
| Shear rate | 500~3250 sec$^{-1}$ |
| Amount of filtrate | 4.8~2.2 l/min. |
| Solution after ultrafiltration | |
| Carragheenin concentration | 1.53% by weight |
| Salt concentration | 0.14% by weight |
| pH value | 7.2 |

TABLE 4

| | |
|---|---|
| Diaphragm 6 of cathode compartment 1 | Cation-exchange membrane of Test 3 |
| Diaphragm 10 of anode compartment 2 | Cation-exchange membrane of Test 3 |
| Cathode side diaphragm 7 of receiving compartment | Cation-exchange membrane of Test 3 |
| Anode side diaphragm 9 of receiving compartment | Cation-exchange membrane of Test 3 |
| Microporous membrane 8 | Microporous membrane of Example 1 |
| Electrolyte in cathode compartment 1 | Aqueous solution of 2.5% by weight of Na$_2$SO$_4$ |
| Electrolyte in anode compartment 2 | Aqueous solution of 2.5% by weight of Na$_2$SO$_4$ |
| Electrolyte in buffering compartments 3, 4 | Aqueous solution of 2.5% by weight of Na$_2$SO$_4$ |
| Membrane area | 0.1 m$^2$ per compartment |
| Number of receiving compartments | 5 |
| Thickness of receiving compartment | 18 mm |
| Current density | 0.5 A/dm$^2$ |
| Duration of dehydration | 60 minutes |

TABLE 2

| | | Conditions of dehydration | | | Liquid withdrawn through outlet | | Produced gel | |
|---|---|---|---|---|---|---|---|---|
| Example No. | Water-containing substance | Electric field* (V/cm) | Duration (minutes) | Average current (A) | Amount (cc) | Solids content (Wt %) | Amount (cc) | Solids content (Wt %) |
| 10 | Aqueous solution of 2% by weight of pectin | 11 | 60 | 0.1 | 50 | 0.5 | 3.9 | 17.4 |

*Electric field applied between the receiving compartments.

EXAMPLE 11

The amount 6.67 kg of Chondrus Crispus seaweed was washed with water to remove impurities, such as adhering sand grains. The clean seaweed was extracted with hot water at 90° C. The resultant extract was filtered to produce 153 liters of extract having λ-carragheenin as its main component.

This extract was diluted with an aqueous NaOH solution to produce a solution of concentration 0.05N NaOH (170 liters) and was denatured with alkali at 90° C.

The resultant solution was neutralized by addition of an aqueous 1N HCl solution and the desalinated and concentrated by ultrafiltration in an internal pressure type hollow-fiber type ultrafiltration module under the conditions indicated in Table 3.

The desalination and the hydration and concentration were carried out by having the solution circulated within the ultrafiltration device, with concentration and The electrolytes of the cathode compartment 1 and the anode compartment 2 were circulated and neutralized. The electrolytes of the buffering compartments 3, 4 were continually replenished by introduction of fresh supply during the dehydration.

EXAMPLE 12

An aqueous solution of 1.06% by weight of iota carragheenin (extraneous salt concentration of 0.19% by weight) was continuously fed at 40° C. into the apparatus of Example 11 and dehydrated by following the procedure of Example 11; except that the aqueous solution of 2.5% by weight of $Na_2SO_4$ was substituted with an aqueous solution of 1% by weight of $CaCl_2$, the cation-exchange membranes used as the cathode side diaphragm 7, and the anode side diaphragm 9 were substituted with sheets of the polyvinyl alcohol film used in Example 7, and the duration of dehydration was changed to 45 minutes. The solution assumed a state of paste because the interior of the receiving compartment was at room temperature. The results of the dehydration by electro-osmosis were as shown in Table 5. It is noted from this table that both dehydration speed and dehydration efficiency were on satisfactory levels.

TABLE 5

| Example No. | Water withdrawn through outlet | | Produced paste | | Average voltage applied between electrodes (V) |
| --- | --- | --- | --- | --- | --- |
| | Amount (cc) | Solids content (Wt %) | Amount (g) | Solids content (Wt %) | |
| 11 | 1070 | ~0 | 2820 | 12 | 49 |
| 12 | 910 | ~0 | 3270 | 5 | 87 |

EXAMPLE 13

In an apparatus similar to the apparatus of Example 1 (except that the polyethylene type microporous membrane used as the microporous membrane 8 was substituted with the microporous membrane of Test 4), 27.1 g of gel of 4.97% by weight of iota carragheenin was placed in the receiving compartment 5 and dehydrated by electro-osmosis for 30 minutes under the condition of constant current 0.1 A.

Consequently, 7.5 cc of water was withdrawn through the outlet 12 and iota carragheenin was deposited in the form of gel inside the receiving compartment 5. The gel was found to have a solids content of 7.4% by weight. Practically all the water resulting from the dehydration was separated through the outlet 12.

The average voltage applied between the receiving compartments was only 7 V, indicating that the gel could be dehydrated and concentrated efficiently with very small electric power consumption.

EXAMPLE 14

In an apparatus set up as illustrated in FIG. 4, cation-exchange membranes of Test 3 were used as the diaphragms 6, 10; cation-exchange membranes of Test 5 were used as the diaphragms 7, 9; and a hydrophilic microporous membrane of Test 4 was used as the microporous membrane 8. The cathode compartment 1, the anode compartment 2, and the buffering compartments 3, 4, and 14 were filled with an aqueous solution of 5% by weight of NaCl and the receiving compartment 5 (having an available membrane area of 25 $cm^2$ and a compartment thickness of 1 cm) was continuously fed with an aqueous solution of 2.2% by weight of sodium alginate. The dehydration by electro-osmosis was carried out for 60 minutes under the condition of current density 0.5 $A/dm^2$. The average voltage applied between the diaphragm 7 adjacent to the cathode side and the diaphragm 9 was 4 V, the amount of water separated consequently was 24 cc, and the amount of produced paste was 16.3 g. This paste was found to have a solids content of 7.6% by weight, indicating that the paste had been efficiently dehydrated. The water separated from the aqueous solution and the produced paste both retained neutral pH values.

EXAMPLE 15

The procedure of Example 14 was faithfully repeated; except that cation-exchange membranes of Test 6 were used as the diaphragms 7, 9; a polyethylene type microporous membrane used in Example 1 was adapted as the microporous membrane 8; an aqueous solution of 1% by weight of NaCl was used as the electrolytes and the buffer solution; and an aqueous solution of 1.77% by weight of λ-carragheenin (having extraneous salt content about 0% by weight) was used as the water-containing substance for dehydration.

The average voltage applied between the diaphragms 7 adjacent to the cathode side and the diaphragm 9 was 14 V, the amount of water separated was 16.8 cc, and the amount of produced paste was 24.2 g. This paste was found to have a solids content of 5.3% by weight, indicating that the aqueous solution had been efficiently dehydrated. The separated water and the produced paste both retained neutral pH values.

EXAMPLE 16

In an apparatus set up as illustrated in FIG. 2, cation-exchange membranes (having available membrane area 25 $cm^2$) of Test 7 were used as the diaphragms 7, 9; and a microporous membrane used in Example 1 was adapted as the microporous membrane 8. The electrode side diaphragms were separated from each other by 13 mm, and the electrolyte in the electrode compartments was an aqueous solution of 5% by weight of sodium sulfate. The water-containing substance for dehydration used was a crystalline cellulose slurry having a solids content of 10% by weight, produced by hydrolyzing the noncrystalline portion of pulp with weak hydrochloric acid, washing the resultant hydrolyzate, and subjecting the washed hydrolyzate to grinding until an average particle diameter of 2 microns was gained. An electric field of 45 V/cm was applied to the apparatus for 30 minutes. The average current was 25 mA. Through the lower outlet 12, about 24 cc of liquid (having water-soluble solids content of 0 Brix as determined by Brix refractometer).

After the dehydration, the water-containing substance assumed a state of cake. The solids content was 39% by weight showing desirable result.

EXAMPLE 17

In the same apparatus as used in Example 16, the electrode side diaphragms were separated by a distance of 15 mm, the electrolyte in the electrode compartments was an aqueous solution of 5% by weight of sodium sulfate, and the water-containing substance for dehydration was an aqueous solution of 2% by weight of sodium alginate (having water-soluble solids content of 2.0 Brix as measured by a sugar refractometer and a viscosity of 2800 cps). A DC electric field of 7 V/cm was applied for two hours. As the supply of the water-containing substance in the cell decreased, a fresh supply of the aqueous solution of sodium alginate was added. The magnitude of electric current was substantially constant at 0.25 A. The liquid (27 cc) which passed the microporous membrane and fell down the cell was found to have water-soluble solid content of 0 Brix, indicating that no part of sodium alginate was allowed to pass the microporous membrane. The amount of 14.1 g of gel was deposited on the anode membrane. It was found to have a solids content of 16%, indicating that the aqueous solution was amply dehydrated.

EXAMPLE 18

The procedure of Example 17 was repeated, except that a water-containing substance containing 2% by weight of tragacanth gum (having a viscosity of 27000 cps and a water-soluble solids content of 1.7 Brix) was used as the water-containing substance, and an electric field of 19 V/cm was applied for three hours. Through the outlet, 12 cc of liquid having a water-soluble solids content of 0.2 Brix passed. The average current was only 5 mA, and the amount of water removed per KwH was 18 kg. These were outstanding results.

EXAMPLE 19

An electric field or 10 V/cm was applied for five hours to paste of undecomposed extract of gelatin (having a solids content of 10% by weight and a viscosity of 15000 cps) by following the procedure of Example 17. The average current was 30 mA. During the dehydration, a total of 7 cc of liquid having water-soluble solids content of 6 Brix fell was removed. This amount corresponded to about ⅓ the water present in the paste. Consequently, the water-containing substance turned to paste having a solids content of 60% by weight.

EXAMPLES 20–23

An aqueous solution of about 2% by weight of sodium alginate, [having salt concentration about 100% (based on sodium alginate)] obtained by dissolving and extracting brown algae (class Phaeophyceae) with an aqueous alkali solution and filtering the resultant extract, was opposed to pure water across a cellophane membrane (having a thickness of 20μ) and subjected to diffusion dialysis at 60° C. to effect desalination to varying degrees of about 10%, 20%, 30%, and 50% of salt concentration (based on sodium alginate).

Each of the solutions (G) desalinated to the varying degrees was subjected to dehydration and concentration under application of a DC electric field of 7 V/cm in an apparatus set up as illustrated in FIG. 2, wherein cation-exchange membranes (having an available membrane area of 25 cm²) of Test 8 were used as the electrode diaphragms 7, 9; a polyethylene type microporous membrane used in Example 1 was adapted as the microporous membrane 8; and an aqueous solution of 5% by weight of sodium sulfate was used as the electrolyte in the electrode compartments, with the electrode diaphragms separated from each other by a distance of 15 mm.

As the supply of water-containing substance in the receiving compartment decreased, a fresh supply of water-containing substance was added by way of replenishment.

The results were as shown in Table 6. It is noted from this table that the dehydration speed and the dehydration efficiency increased in proportion as the degree of desalination was increased. The liquid resulting from the dehydration was found to contain substantially no sodium alginate.

TABLE 6

| | Salt concentration (based on sodium alginate) (Wt %) | Amount of water removed (g) | Produced gel Amount (g) | Produced gel Sodium alginate concentration in gel (Wt %) | Dehydration efficiency (kg/KWH) |
|---|---|---|---|---|---|
| Example 20 | 10 | 25.6 | 7.7 | 7.0 | 13.0 |
| Example 21 | 20 | 24.5 | 8.7 | 6.5 | 9.9 |
| Example 22 | 30 | 22.8 | 8.3 | 6.2 | 8.7 |
| Example 23 | 50 | 17.3 | 4.4 | 6.3 | 6.4 |

Dehydration efficiency (kg/KWH) =

$$\frac{\text{Amount of gel}(g) \left\{ \frac{\text{Solids content of gel }(\%)}{\text{Solids content of solution}(G)(\%)} - 1 \right\}}{\frac{60}{\text{Time(minute)}} \cdot \text{Voltage}(V) \times \text{Average current}(A)}$$

EXAMPLE 24

Using the same apparatus as used in Example 1, except that the buffer solution and the electrolyte were changed to the aqueous solution of 5% by weight of sodium sulfate; the dehydration by electro-osmosis of a magnesium hydroxide paste of 56% by weight was conducted under the current density of 1 A/dm² for 70 minutes. The amount of the water withdrawn through the outlet was small as much as 4 cc, proving that the dehydration could be done on an inorganic paste contaning water.

EXAMPLE 25

An aqueous solution of λ-carragheenin was dehydrated by electro-osmosis by following the procedure of Example 15 in the apparatus as illustrated in FIG. 1; except that an anion-exchange membrane of b 140 μ thick (produced by Asahi Kasei Kogyo Kabushiki Kaish and marketed under trademark designation of Aciplex A-171; having an electric resistance of 7.5 Ω-cm², and an electro-osmotic coefficient of 273 cc/F) was used as the diaphragm 7, and an aqueous solution of 0.5N $Na_2SO_4$ was used as the electrolyte and buffer solution.

The average voltage between the diaphragms 7 and 9 was 7 V, the amount of water separated was 6.9 cc, and the amount of produced paste was 5.1 g. This paste was found to have a solids content of 9.5% by weight, indicating that the aqueous solution had been efficiently dehydrated.

EXAMPLE 26

An aqueous solution of λ-carragheenin was dehydrated by electro-osmosis by following the procedure of Example 25; except that the anion-exchange membrane used as the diaphragm 7 was substituted with a commercially available unglazed pottery plate of 1 cm thick (having a specific gravity of 1.98, and an electric resistance of 263 Ω-cm²).

The average voltage between the diaphragms 7 and 9 was 153 V, the amount of water separated was 43.7 cc, and the amount of produced paste was 11.5 g. This paste was found to have a solids content of 7.7% by weight, indicating that the dehydration speed was excellent, though the electric power consumption was relatively high.

EXAMPLE 27

An aqueous solution of λ-carragheenin was dehydrated by electro-osmosis by following the procedure of Example 15, except that the cation-exchange membrane (cation transference number of 0.90) of Test 5 was used as the diaphragm 7, the cation-exchange membrane (cation transference number of 0.98) of Test 3 was used as the diaphragm 9, an aqueous solution of 0.6% by weight of NaCl was used as the buffer solution, and the dehydration time was 4.5 hours.

The average flow rate of each water separated from the outlet of each receiving compartment was 15.9 l/m².hr, the amount of separated water per KWH was 76 Kg and the pH value was 8.4, indicating quite satisfactory results.

$$\text{Average flow rate} = \frac{\text{Amount of separated water (Kg)}}{\text{Effective area of porous membrane (m}^2\text{)} \cdot \text{Dehydration time (hr)}}$$

Each receiving compartment was filled with the produced gel of λ-carragheenin havng a solids content of 15.1% by weight and the pH value of the gel was 6.8, indicating quite satisfactory results.

What is claimed is:

1. A method for the dehydration of a water-containing substance by means of an electro-osmotic force of a microporous membrane, which comprises
providing an electro-osmotic cell including an anode and a cathode; and a receiving compartment formed in a space between said anode and said cathode including a pair of diaphragms of semi-permeable membranes, one diaphragm arranged toward said anode and the other arranged toward said cathode, and a microporous membrane arranged therebetween,
supplying a water-containing substance to said receiving compartment between said microporous membrane and said diaphragm arranged toward said anode,
passing electric current between said anode and said cathode, thereby dehydrating said water-containing substance by causing water to pass through said microporous membrane, and
removing water resulting from said dehydration through an intervening space between said microporous membrane and said diaphragm arranged toward said cathode.

2. A method according to claim 1, wherein said semipermeable membranes have a smaller electro-osmotic coefficient than said microporous membrane.

3. A method according to claim 1, wherein said microporous membrane is a hydrophilic high molecular microporous membrane.

4. A method according to claim 1, wherein said microporous membrane is a polyethylene microporous membrane.

5. A method according to claim 1, wherein said microporous membrane has a porosity in the range of 20 to 90% and an average pore diameter in the range of 10 Å to 10μ.

6. A method according to claim 1, wherein said semipermeable membranes are cation-exchange membranes.

7. A method according to claim 1, wherein said water removed from said intervening space is essentially free from non-water components contained in the water-containing substance.

8. A method according to claim 1, wherein said intervening space is provided so that major portions of opposed surface of said microporous membrane and said diaphragm arranged toward said cathode are in contact with each other so that a liquid is retained on an interface therebetween.

9. A method according to claim 1, wherein said intervening space is provided so that major portions of opposed surfaces of said microporous membrane and said diaphragm arranged toward said cathode are in intimate contact with each other.

10. A method for the dehydration of a water-containing substance within a receiving compartment provided in a space between an anode and a cathode by means of an electro-osmotic force of a microporous membrane, which comprises:
passing an electric current between the electrodes, and
withdrawing the water resulting from said dehydration through an intervening space between a cathode side diaphragm and said microporous membrane,
wherein, semipermeable membranes are used as diaphragms to form said receiving compartment, which diaphragms include said cathode side diaphragm; and said microporous membrane is arranged on the anode side of said cathode side diaphragm.

11. An apparatus for the dehydration of a water-containing substance by electro-osmosis, comprising an anode and a cathode and; a receiving compartment formed in a space between said anode and said cathode including a pair of diaphragms of semi-permeable membranes, one diaphragm arranged toward said anode and the other arranged toward said cathode, and a microporous membrane arranged therebetween; said microporous membrane and said diaphragm arranged toward said cathode have at least major parts of their opposed surfaces in contact with each other so that a liquid can be retained on an interface therebetween by surface tension, which includes said major parts being in intimate contact with each other, and the remaining minor parts of said opposed surfaces are separate by a distance large enough to provide a space for withdrawal of water.

12. An apparatus according to claim 11, wherein buffering compartments for admitting a buffer solution are arranged between said electrodes and said receiving compartment.

13. An apparatus according to claim 11, wherein a plurality of receiving compartments are arranged in the intervening space between said cathode and said anode.

14. An apparatus according to claim 13, wherein buffering compartments are arranged between adjacent pairs of said receiving compartments.

15. An apparatus according to claim 11, wherein said semipermeable membranes have a smaller electro-osmotic coefficient than said microporous membrane.

16. An apparatus according to claim 11, wherein said microporous membrane is a hydrophilic high molecular microporous membrane.

17. An apparatus according to claim 11, wherein said microporous membrane is a polyethylene microporous membrane.

18. An apparatus according to claim 11, wherein said microporous membrane has a porosity in the range of 20 to 90% and an average pore diameter in the range of 10 Å to 10μ.

19. An apparatus according to claim 11, wherein said semipermeable membranes are cation-exchange membranes.

20. An apparatus according to claim 11, wherein said major parts of said opposed surfaces are in intimate contact with each other.

* * * * *